(12) United States Patent
Moniz et al.

(10) Patent No.: US 10,083,187 B2
(45) Date of Patent: Sep. 25, 2018

(54) GENERATING GEOGRAPHIC BORDERS

(71) Applicant: International Business Machines Corporation, Armonk, NY (US)

(72) Inventors: Michael J. Moniz, Bradford (CA); Robert Y. Nonez, Orleans (CA)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 14/838,833

(22) Filed: Aug. 28, 2015

(65) Prior Publication Data

US 2017/0060902 A1 Mar. 2, 2017

(51) Int. Cl.
*G06F 17/30* (2006.01)

(52) U.S. Cl.
CPC .. *G06F 17/30241* (2013.01); *G06F 17/30991* (2013.01)

(58) Field of Classification Search
None
See application file for complete search history.

(56) References Cited

U.S. PATENT DOCUMENTS

| | | | |
|---|---|---|---|
| 7,576,754 B1 | 8/2009 | Joseph et al. | |
| 7,853,270 B2 | 12/2010 | Riise et al. | |
| 7,937,402 B2 | 5/2011 | Feng et al. | |
| 8,250,052 B2 | 8/2012 | Barnett | |
| 2009/0132953 A1* | 5/2009 | Reed, Jr. | G06F 3/0481 715/781 |
| 2015/0169976 A1* | 6/2015 | Ibrahim | G06K 9/00476 345/629 |

FOREIGN PATENT DOCUMENTS

CN 103609144 2/2014

OTHER PUBLICATIONS www.google.com/maps/, publication date unknown, printed on Aug. 26, 2015.
Nor Fuzaina Ismail, http://www.wseas.us/e-library/conferences/2013/Malaysia/ACACOS/ACACOS-26.pdf, publication date unknown, printed on Aug. 26, 2015.
Blaylock, Nate, https://www.cs.rochester.edu/research/speech/pursuit/quest09.pdf, publication date unknown, printed on Aug. 26, 2015.
http://www.fs.usda.gov/main/r4/landmanagement/gis, publication date unknown, printed on Aug. 26, 2015.
http://www.disruptivegeo.com/2013/03/world-country-polygon-datasets/, publication date unknown, printed on Aug. 26, 2015.
Blaylock, Nate, https://www.cs.rochester.edu/research/speech/pursuit/lrec_spatia108.pdf, publication date unknown, printed on Aug. 26, 2015.
Lu, Yun, http://cake.fiu.edu/Publications/Lu+al-13-TG.TerraFly_GeoCloud_Online_Spatial.CIKM2013.camera-ready.pdf, publication date unknown, printed on Aug. 26, 2015.

* cited by examiner

*Primary Examiner* — Anh Tai Tran
(74) *Attorney, Agent, or Firm* — Nolan M. Lawrence

(57) ABSTRACT

Techniques are described for generating geographic borders. In one example, techniques include recognizing a geographic location, determining a starting latitude and a starting longitude and population for the geographic location, and generating a border for the geographic location based on the starting latitude, starting longitude, and population.

9 Claims, 6 Drawing Sheets

GENERATING GEOGRAPHIC BORDERS

TECHNICAL FIELD

The invention relates to geographical mapping software and systems.

BACKGROUND

Geography is an area that is widely used today in natural language. Data for borders/perimeters of continents and countries is available but not necessarily consistent as different countries disagree of territory. For provinces and cities the data is scarce or non-existent. Population and population density are generally available from cities to continents which provides a consistent measure across landmass.

SUMMARY

In general, examples disclosed herein are directed to techniques for generating geographic borders. In one example, techniques include recognizing a geographic location, determining a starting latitude and a starting longitude and population for the geographic location, and generating a border for the geographic location based on the starting latitude, starting longitude, and population.

In other example, a computer system for generating geographic borders includes one or more processors, one or more computer-readable memories, and one or more computer-readable, tangible storage devices. Program instructions are stored on at least one of the one or more storage devices for execution by at least one of the one or more processors via at least one of the one or more memories, to recognize a geographic location, determine a starting latitude and a starting longitude for the geographic location, determine a population for the geographic location, and generate a border for the geographic location based on the starting latitude, starting longitude, and population.

In another example, a computer program product includes a computer-readable storage medium has program code embodied therewith. The program code is executable by a computing device to recognize a geographic location, determine a starting latitude and a starting longitude for the geographic location, determine a population for the geographic location and generate a border for the geographic location based on the starting latitude, starting longitude, and population.

DETAILED DESCRIPTION

Various examples are disclosed herein for generation of geographic borders. In one aspect, a system is disclosed for calculating a pseudo-border for a perimeter when the information is unavailable or does not exist. By coupling a starting latitude and longitude with population and population density it is possible to approximate the shape of the location. This gives the advantage of not just assuming a border or a targeting a specific radius as a default, as currently done in the prior art, including but not limited to Google Maps. Google Maps handles searches in a very specific way. For example, take the search: "Pizza near Me" or "Pizza near Ottawa". Google Maps applies a 'in' restriction not 'near' and thus will not return results for cities surrounding Ottawa but will only get results in Ottawa.

For a given geographical region the most available data know are sub-regions, population, population density and latitude, longitude of all geographical components. The first step is to determine a radius proportional to population and population density of the region in question. Using the fact that the population density was calculated based on known area that gives a general understanding of the surface area.

Without additional information the shape can only be assumed to be square or circular with the latitude, longitude as the center. The area of a circle is known to be: $A=\pi R^2$, as illustrated by this first equation:

$$r = \sqrt{\frac{A}{\pi}}$$

Population density is the number of people per Area, as illustrated by this second equation:

$$A = \frac{population}{population density}$$

Figure 1:
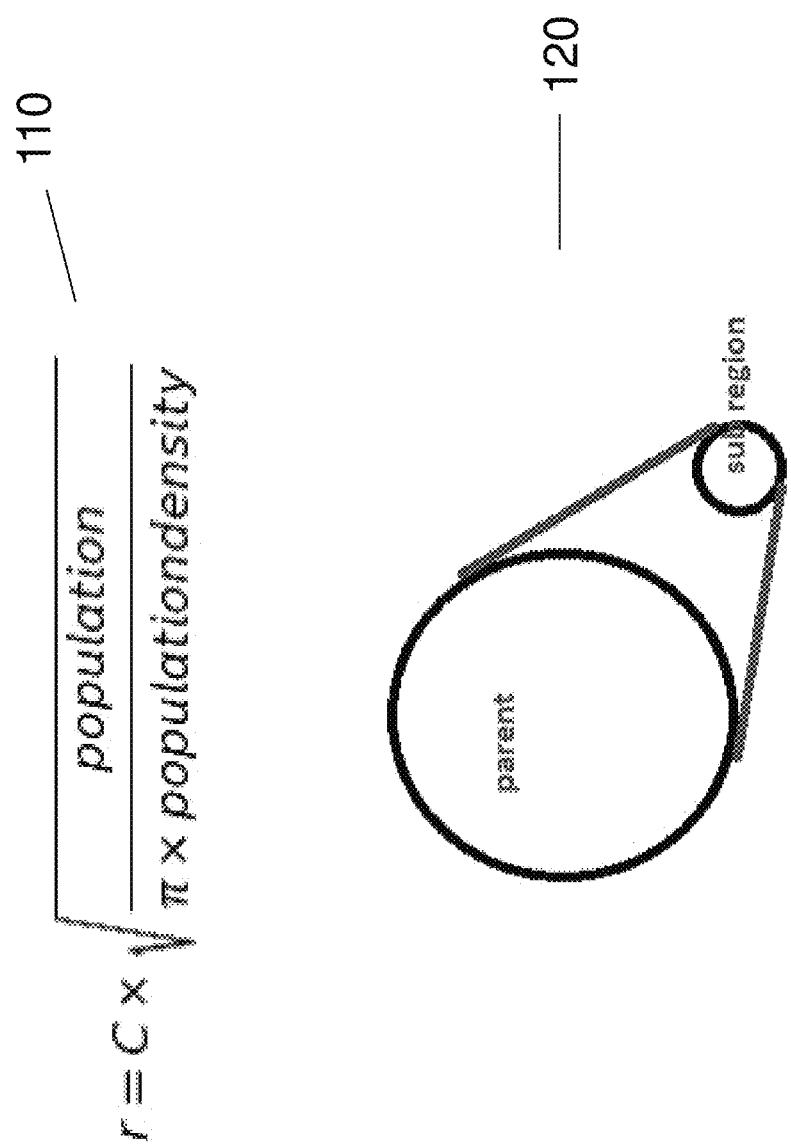
FIG. 1 is an illustration of equations for generating geographic borders.

The combination of the first and second equations solves for radius, as illustrated by equation 110 shown in FIG. 1, where C is some constant to define the distance in Kilometers. Note that this is forcing the shape of the region into a circle which in general will not map to the actual border.

A second step is needed to reduce the error and improve the shape. The next piece of information available is sub-regions (if the region is not the lowest in the hierarchy of geographical regions). This step repeats step 1 but for all sub-regions providing a perimeter of each sub region (generating several circles that may or may not intersect).

Figure 4:
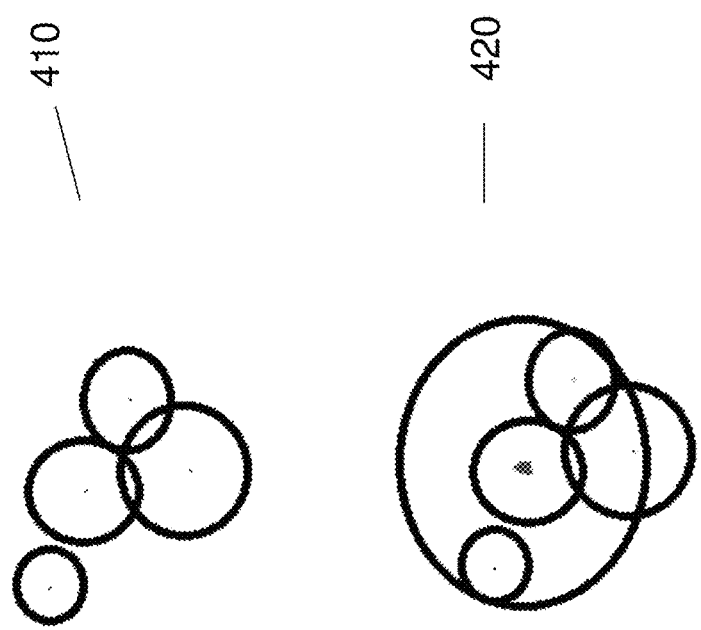
FIG. 4 is a block diagram illustrating mapping out a perimeter.

As shown in FIG. 4, Overlay the circles 410 generated from Steps 1 and 2 to map out a perimeter with any protruding elements generated from inner circles.

Step 3 is to close the shape (border). It is possible in extreme cases for the sub regions to be completely outside the parent. One possible way to generate a completed border is to calculate a line tangent to each circle that exceeds the parent range and from the parent itself to close the shape. The above steps generate a completed border 420, as shown in FIG. 4, to approximate a geographical region 120 as shown in FIG. 1.

Figure 5:
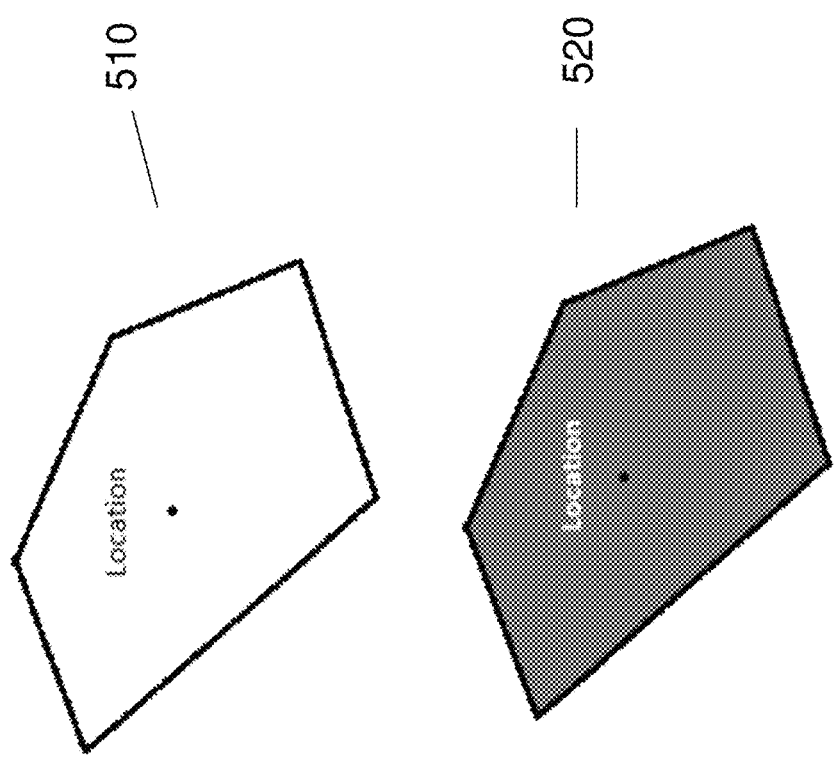
FIG. 5 is a block diagram illustrating outlining a component.

An additional aspect is how this can relate to natural language restrictions such as in, near and outside. Assuming the border is now calculated by steps 1 and 2, to outline the next component this border 510 is now displayed, as shown in FIG. 5

The following scenarios are used to illustrate the types of restrictions the system could handle but is not necessarily limited to.

Scenario for In: Restriction is determined for anything within the perimeter 520 defined as illustrated in FIG. 5. This is a less than operation.

Scenario for Around or Near: Restriction is determined for anything within the perimeter defined plus some extra buffer defined. This buffer does not necessarily have to be radial about the center. This buffer can be generated in the same way as our initial location with an additional multiplier. The multiplier does not need to be constant it could be derived from the natural language question.

$$r_b = B \times C \times \sqrt{\frac{population}{\pi \times populationdensity}}$$

Where "rb" is the radial border including an additional buffer and B is the multiplier to expand the radius.

Figure 6:
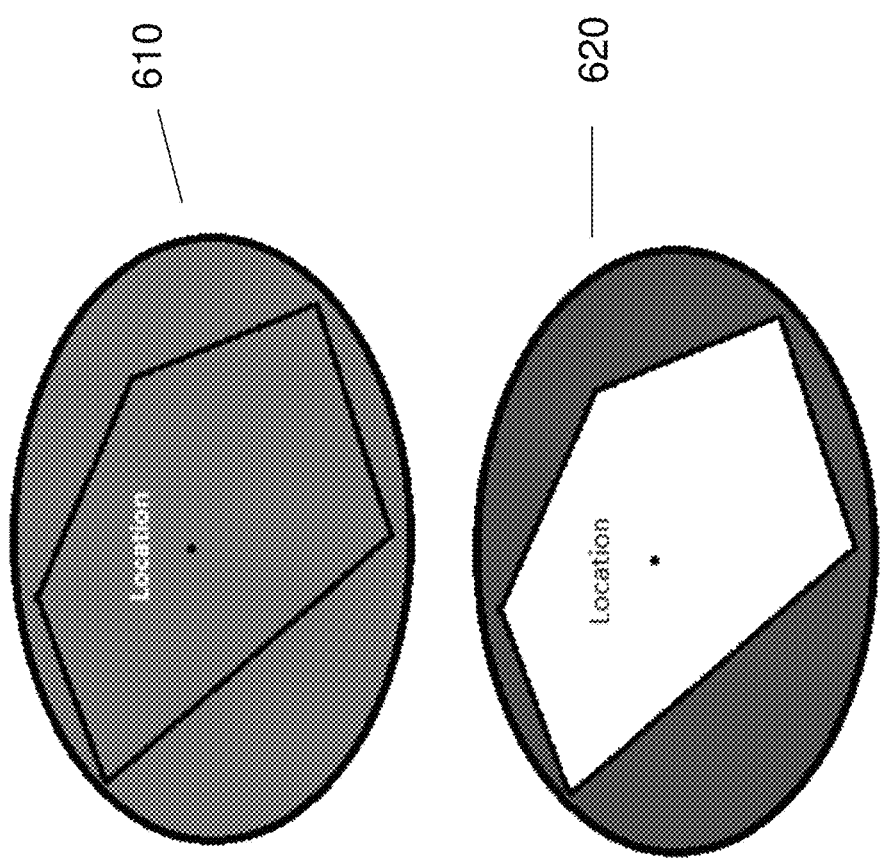
FIG. 6 is a block diagram illustrating calculating an outer border.

In the FIG. 6, the outer border 610 shows the additional buffer calculated for a location in an 'around' or 'near' restriction.

Scenario for Outside: Restriction is determined for anything outside 620 the perimeter defined plus some extra buffer defined. This buffer does not necessarily have to be radial about the center.

Take for example, the following sample query:

Sample Question: "what are my sales around Ottawa"

What follows is an example of how this system could work on this sample query:

Step 1: Recognize geographical location

Step 2: Bind Columns to Data

Step 3: Determine border for region 3.a—Create a radius using equation 4 using the latitude/longitude as the starting point 3.b—Create more precise shape by repeating step 3.a for each sub-region of the location 3.c—Close the shape to generate a completed border Step 4: Determine the restriction type (around, near, in, within, outside, etc) and generate buffer if required Step 5: Calculate the corresponding filters based on restriction to the selected columns determined in step 2.

Step 6: Show visualization to the user with the geographical spacial restriction applied.

Applying the above procedure to the sample query yields the following:

Step 1: Recognize geographical location:

Ottawa, Canada

Step 2: Bind Columns to Data:

'sales'→'Sales', 'Ottawa'→'Department Location'

Step 3: Determine border for region 3.a—Create a radius using equation 4 using the latitude/longitude as the starting point 3.b—Create more precise shape by repeating step 3.a for each sub-region of the location 3.c—Close the shape to generate a completed border Step 4: Determine the restriction type (around, near, in, within, outside, etc) and generate buffer if required:Restriction 'Around' detected Step 5: Calculate the corresponding filters based on restriction to the selected columns determined in step 2

Department Location→Restriction=Around Ottawa

Nepean, Montreal, Barrhaven, Ottawa, Gatineau

Step 6: Show visualization to the user with the geographical spacial restriction applied.

Figure 2:
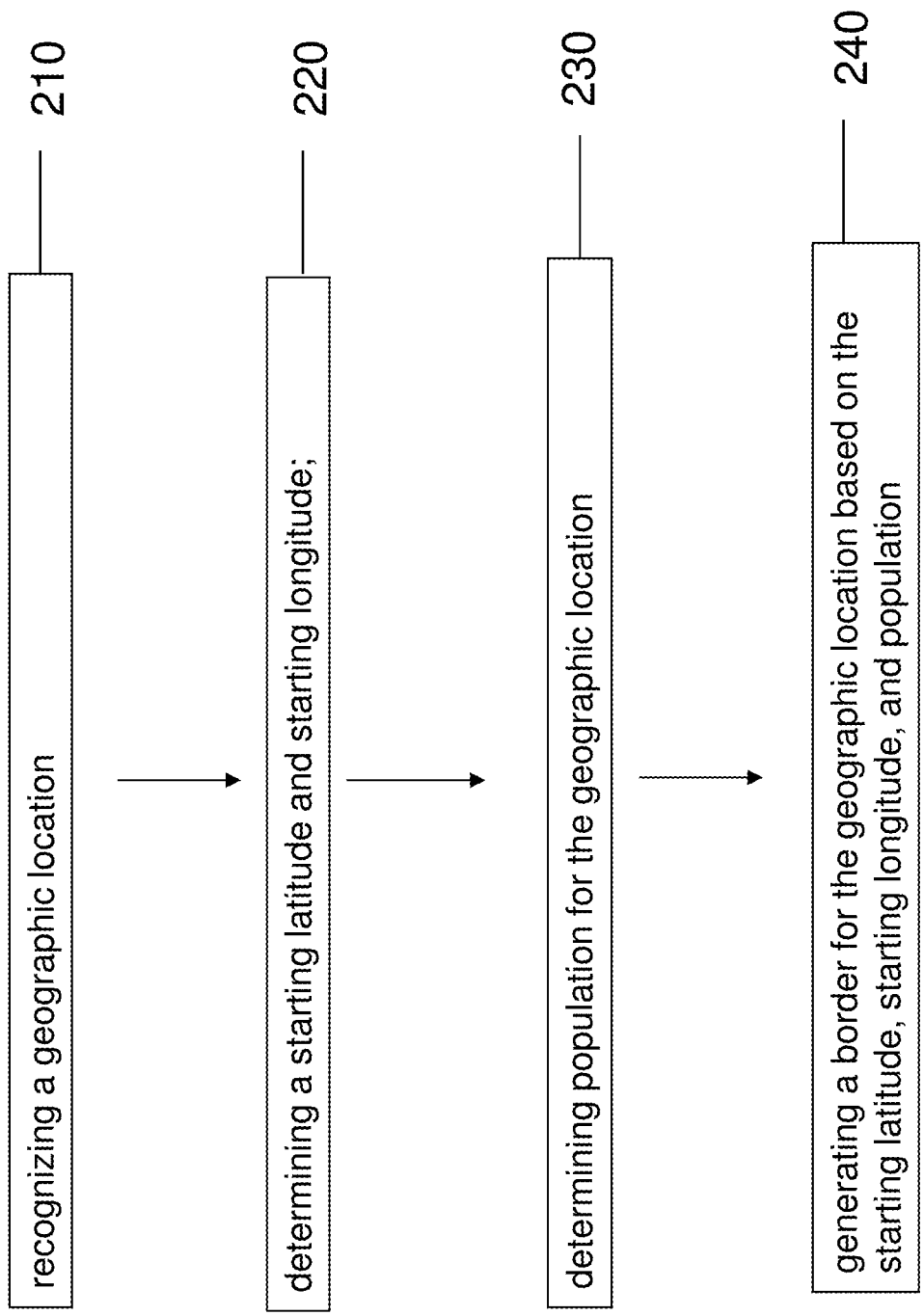
FIG. 2 is a flow diagram illustrating a method for generating geographic borders.

As shown in FIG. 2, a computer-implemented method according to one aspect of the invention includes recognizing a geographic location (step 210), determining a starting latitude and starting longitude for the geographic location (step 220), determining a population for the geographic location (step 230), and generating a border for the geographic location using the starting latitude, starting longitude, and population (step 240.)

In one embodiment, the method can further including determining a restriction type to be applied to the geographic location. The restriction type can be one of the following (but not limited to): a near type, an inside type, an outside type, and around type.

In one embodiment, the method can further include receiving a user request for information about a geographic location and displaying a visual representation of the geographic location with the generated border.

Figure 3:
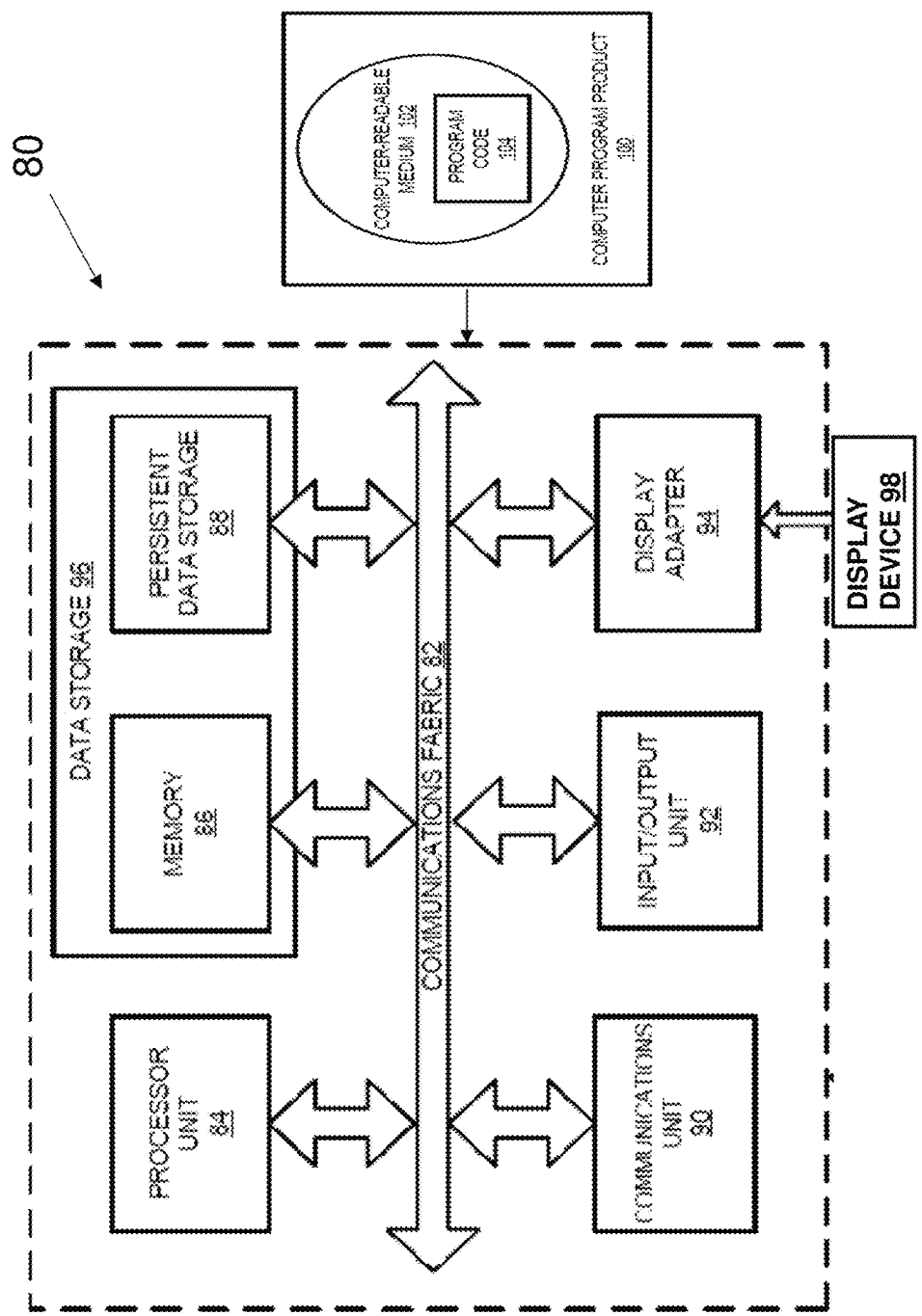
FIG. 3 is a block diagram of a computing device for generating geographic borders.

FIG. 3 is a block diagram of a computing device 80 that may be used to execute a bandwidth sharing program, according to an illustrative example. Computing device 80 may be a server such as a web server or application server. Computing device 80 may also be a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 3, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Some examples may use such a non-transitory medium. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a semantic model constructor 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over nontangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of IBM CONFIDENTIAL D-2 the invention.

It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating geographic borders, the method comprising:
   receiving a user request for information about a first geographic location, wherein the user request includes a location, and wherein the request includes a restriction type;
   recognizing, from the location of the received user request, the first geographic location;
   determining a starting latitude and a starting longitude for the first geographic location;
   determining a first population for the first geographic location, wherein the first population includes a first population value and a first population density value of the first geographic location;
   determining the restriction type includes a near type;
   determining, based on the determined restriction type is a near type and based on the first population value and based on the first population density value, a radius of the first geographic location;
   identifying, based on the determined radius of the first geographic location, a second geographic location, wherein the second geographic location is separate and distinct from the first geographic location, and wherein the second geographic location includes a second latitude and a second longitude;
   determining, a second population for the second geographic location, wherein the second population includes a second population value and a second population density value of the second geographic location; and
   generating a border for the first geographic location based on the starting latitude, starting longitude, first population, second latitude, second longitude, and second population.

2. The method of claim 1, further comprising:
   displaying a visual representation of the first geographic location with the generated border.

3. The method of claim 1, wherein:
   generating a border includes calculating one or more sub-regions.

4. A computer program product for processing natural language queries for geographic data sets, the computer program product comprising a computer-readable storage medium having program code embodied therewith, the program code executable by a computing device to:
   receive a first natural language query, the first natural language query directed towards a first geographic location;
   parse the received first natural language query with a natural language processing engine;
   detect, based on the parsing, the first geographic location in the first natural language query;
   retrieve, based on the detected first geographic location, a population value and a population density value;
   determine, based on the retrieved population value and based on the retrieved population density value, a radius around the first geographic location;
   draw, based on the determined radius, a border of the first geographic location;
   detect, based on the parsing, a geographic restriction of the first geographic location in the first natural language query, wherein the geographic restriction is outside the first geographic location;
   retrieve, based on the detected geographic restriction and based on the drawn border, a second population value and a second population density value, wherein the retrieved second population value and the retrieved second population density value are of a second geographic location within the drawn border;
   determine, based on the retrieved second population value and based on the retrieved population density value, a second radius around the second geographic location;
   redraw, based on the determined second radius, the border of first geographic location, wherein the redrawn border includes both the first geographic location and the second geographic location;
   detect, based on the parsing, a topic value in the first natural language query; and
   generate, based on the detected topic value and based on the redrawn border, a response to the first natural language query.

5. The computer program product of claim 4, wherein the first geographic location is a first city and wherein the second geographic location is a second city, and wherein the first city is separated from the second city.

6. The computer program product of claim 5, wherein the first geographic location is a first latitude and longitude and wherein the second geographic location is a second latitude and longitude.

7. A system for processing natural language queries for geographic data sets, the system comprising:
   a memory, the memory including computer-readable program instructions; and
   a processor, the processor communicatively coupled to the memory, the processor in response to reading the program instructions configured to:

receive a first natural language query, the first natural language query directed towards a first city;

parse the received first natural language query with a natural language processing engine;

detect, based on the parsing, the first city in the first natural language query;

retrieve, based on the detected first city, a population value and a population density value;

determine, based on the retrieved population value and based on the retrieved population density value, a radius around the first city;

draw, based on the determined radius, a border of the first city;

detect, based on the parsing, a geographic restriction of the first city in the first natural language query;

retrieve, based on the detected geographic restriction and based on the drawn border, a second population value and a second population density value, wherein the retrieved second population value and the retrieved second population density value are of a second city adjacent to the drawn border, and wherein the second city is distinct and separate from the first city;

determine, based on the retrieved second population value and based on the retrieved population density value, a second radius around the second city;

redraw, based on the determined second radius, the border of first city, wherein the redrawn border includes both the first city and the second city;

detect, based on the parsing, a topic value in the first natural language query; and generate, based on the detected topic value and based on the redrawn border, a response to the first natural language query.

8. The computer program product of claim 7, wherein the geographic restriction is outside of the first city.

9. The computer program product of claim 7, wherein the geographic restriction is near the first city.

* * * * *